United States Patent [19]
MacKay et al.

[11] Patent Number: 5,190,739
[45] Date of Patent: Mar. 2, 1993

[54] PRODUCTION OF CARBON BLACKS

[75] Inventors: Bruce E. MacKay, Framingham; Mark A. Wilkinson; Barrie J. Yates, both of Lexington, all of Mass.

[73] Assignee: Cabot Corporation, Boston, Mass.

[21] Appl. No.: 818,943

[22] Filed: Jan. 10, 1992

Related U.S. Application Data

[63] Continuation-in-part of Ser. No. 661,741, Feb. 27, 1991, abandoned.

[51] Int. Cl.$^5$ .................................................. C09C 1/50
[52] U.S. Cl. ..................................... 423/450; 423/456
[58] Field of Search ............................. 423/450, 456

[56] References Cited

U.S. PATENT DOCUMENTS

| | | | |
|---|---|---|---|
| 2,985,511 | 5/1961 | Norris et al. | 423/457 |
| 3,989,804 | 11/1976 | Vanderveen | 423/456 |
| 4,327,069 | 4/1982 | Cheng | 423/450 |
| 4,822,588 | 4/1989 | Gravley et al. | 423/456 |
| 5,009,854 | 4/1991 | Jones, Jr. | 423/456 |

Primary Examiner—Michael Lewis
Assistant Examiner—Stuart L. Hendrickson
Attorney, Agent, or Firm—Lawrence A. Chaletsky; Harry J. Gwinnell

[57] ABSTRACT

A process for preparing carbon blacks having lower-than-normal structure at a given surface area, and lower-than-normal surface area at a given overall combustion level. The process is carried-out by adding auxiliary hydrocarbons, which is hydrogen or any hydrocarbon having a molar hydrogen-to-carbon ratio greater than the molar hydrogen-to-carbon ratio of the feedstock, to the reaction zone of a carbon black reactor and adjusting the primary combustion and overall combustion so that the SSI of the process is less than zero.

18 Claims, 1 Drawing Sheet

PRODUCTION OF CARBON BLACKS

This application is a continuation-inpart of U.S. Pat. application Ser. No. 07/661,741, filed Feb. 27, 1991, now abandoned.

FIELD OF THE INVENTION

The present invention relates to a method for producing carbon blacks.

BACKGROUND

The present invention relates to the production of furnace blacks having many important applications such as fillers, pigments and reinforcing agents in rubbers and plastics. Generally, the furnace process for preparing these blacks entails the cracking and/or incomplete combustion of a hydrocarbon feedstock such as natural gas or catalytic cracker cycle stock in an enclosed conversion zone at temperatures above 1255 K (1800° F.) to produce carbon black. The carbon black entrained in the gases emanating from the conversion zone is then cooled and collected by any suitable means conventionally used in the art. It has, however, been extremely difficult and normally not commercially feasible to produce furnace blacks having lower structure and surface area characteristics than those that normally result from the use of any particular feedstock.

Accordingly, it is a primary object of the present invention to provide a novel and improved process for preparing carbon blacks which exhibit lower-than-normal structure at a given surface area, and lower-than-normal surface area at a given overall combustion level.

As referred to herein and known to those skilled in the art, the overall combustion represents the total amount of oxidant such as air used in the carbon forming process relative to the amount of oxidant required for the complete combustion of the total amount of hydrocarbon used in the carbon forming process to form carbon dioxide and water. The overall combustion is usually expressed as a percentage.

Also known in the prior art are the following processes which include auxiliary hydrocarbon addition, but which differ from the present process as follows.

In the process described in U.S. Pat. No. 2,782,101 auxiliary hydrocarbon is used to neutralize oxidizing components of blast flame gases prior to mixing with the hydrocarbon feedstock. As distinguished from the process of that patent, in the present invention the auxiliary hydrocarbon is not intended to neutralize the oxidizing components of the hot blast flame gases. To the contrary, in the present invention, auxiliary hydrocarbon enters the reaction zone in an essentially unreacted form.

Furthermore, the present process differs from the process of U.S. Pat. No. 3,952,087 in which an auxiliary hydrocarbon is introduced into a multi-stage process in order to produce blacks having higher than normal structure. When auxiliary hydrocarbon is added under the operating conditions of that patent and surface area is kept constantly decreasing the feedstock flow rate to the reactor, structure increases resulting in a structure sensitivity index (SSI) defined hereinafter, greater than zero, whereas in the process of the present invention the structure sensitivity index must be less than zero to produce blacks having lower than normal structure and surface area levels. The intent of the patentee of U.S. Pat. No. 3,952,087 is to operate under conditions at which the SSI is always greater than zero, whereas the intent of the present process is to operate under conditions at which the SSI is always less than zero.

The SSI of a carbon forming process is a measure of the capability of auxiliary hydrocarbon injection into that process to reduce the structure of carbon black so-produced relative to the same carbon forming process producing carbon black with the same surface area but without auxiliary hydrocarbon addition. In particular, the following equation is used to define the structure sensitivity index (SSI):

$$SSI = \frac{SAS_{mf} - SAS_{ah}}{|SAS_{mf}|}$$

where $SAS_{mf}$ is the structure area-sensitivity (SAS) of the carbon black producing process when additional feedstock is introduced and $SAS_{ah}$ represents the SAS of the carbon black producing process when auxiliary hydrocarbon is introduced. The structure area-sensitivity is calculated using the following equation:

$$SAS = \left[ \frac{\Delta DBP}{\Delta \text{Iodine Number}} \right]$$

where $\Delta DBP$ represents the change in DBPA of the carbon black due to a change in a single operating condition and $\Delta$Iodine Number represents the change in iodine adsorption number of the carbon black due to the same change in a single operating condition, for example, when either the feedstock or auxiliary hydrocarbon flow rate is changed. The SAS quantifies the effect on structure of a change in surface area.

The term "auxiliary hydrocarbon" as used herein refers to hydrogen or any hydrocarbon having a molar hydrogen-to-carbon ratio greater than the molar hydrogen-to-carbon ratio of the feedstock. Exemplary hydrocarbons include those materials described hereinafter as suitable for use as fuels and/or feedstocks.

Furthermore, the present process differs from the process described in U.S. Pat. No. 2,985,511 in which auxiliary gas is added into the zone where feedstock is being simultaneously introduced for the purpose of independently varying structure without affecting carbon black particle size. To the contrary, in the present process, the surface area is decreased. A decrease in surface area normally correlates with an increase in particle size which therefore illustrates that the particle sizes of the blacks of the present process are increased.

In accordance with the present invention, it has been found that the above and still further objects are achieved by adding auxiliary hydrocarbon to a specific carbon forming process and adjusting the primary combustion and overall combustion to give an SSI less than zero as described in detail hereinafter. The auxiliary hydrocarbon is introduced into the carbon black forming process of the present invention in any suitable manner provided that unreacted auxiliary hydrocarbon enters a location in the process defined herein as the reaction zone. By this term, "reaction zone" there is meant that zone in the carbon forming process wherein the hydrocarbon feedstock, previously introduced, mixed, atomized and vaporized, is at the moment undergoing the major carbon forming reactions to form the carbon particles. More particularly, the reaction zone as referred to herein in the present process refers to a point starting at the location of injection of the hydrocarbon feedstock and extending downstream to the point where the carbon black forming process is terminated by quenching. Preferably, the region in which the auxiliary hydrocarbon is injected extends from about 0.5 reactor diameter lengths upstream of the point of feedstock injection to a point about 0.5 reactor diameter lengths downstream of the point of feedstock injection. In practicing the present invention, the auxiliary hydrocarbon may be injected into the process stream in any convenient manner such as, for example, through an orifice discharging in a direction axial, transverse, or tangential to the direction of flow of the gaseous stream. Furthermore, the point in the process where the auxiliary hydrocarbon is introduced is not critical so long as auxiliary hydrocarbon eventually arrives at the reaction zone in an essentially unreacted form by which is meant in a form not yet fully oxidized or reacted so as to produce carbon black particles. In a preferred embodiment, auxiliary hydrocarbon is gaseous and is introduced transversely from the outer periphery into the carbon forming process at the axial plane where the feedstock is injected transversely from the outer periphery into the stream of hot first-stage gases.

The term "structure" as used herein relative to carbon blacks defines a primary property of carbon black. In general, the term is used in the art to designate the extent of aggregation of the primary particles of a black. Since all blacks manifest some degree of aggregation of the primary particles, a particular black is classified as being a low, normal, or high structure black depending upon the relative degree of aggregation manifested thereby. Delineation between the classifications of low, normal or high structure is generally not well defined. Conventionally, the structure of the black is considered to be high when there is a strong tendency for the particles to form chains of particles. On the other hand, the structure of the black is considered to be low when there is a slight tendency to form aggregates of primary particles. While direct measurement of the structure characteristics of carbon blacks is possible, it has been demonstrated that an equally reliable, and more convenient, method for determining the structure of blacks entails measurements of the oil absorption properties of the blacks. It is this type of oil absorption technique for determining structure characteristics of blacks which is accepted by the art and is designated as ASTM Test Method D-2414-72 entitled "Dibutyl Phthalate Absorption Number of Carbon Black". In brief, the test procedure entails adding dibutyl phthalate (DBP) to a sample of carbon black, in fluffy or pelleted form, in a Brabender-Cabot Absorptometer, made and sold by C. W. Brabender Instruments, Inc., South Hackensack, N.J., and measuring the volume of dibutyl phthalate used. The value is expressed in cubic centimeters or milliliters of dibutyl phthalate (DBP) per 100 grams of carbon black. For purposes of determining the structure of blacks this oil absorption technique employing dibutyl phthalate is employed herein.

The process of the present invention may be carried out by injecting a carbon black-yielding feedstock substantially transversely into a pre-formed stream of hot gases flowing in a downstream direction at an average linear velocity of at least 30.5 meters per second (100 feet/sec) and preferably at least 152.5 meters per second (500 feet/sec). The feedstock may be injected transversely into the first-stage gases from the outer periphery of the stream and/or the feedstock may be injected substantially axially and/or transversely from a location near the center of the first-stage gas stream.

An essential feature of the present process resides in operating in regimes of primary and overall combustion levels in which the structure sensitivity index (SSI), as defined hereinbefore, is less than zero. A further essential feature is the introduction of auxiliary hydrocarbon to the multi-staged carbon forming process so that auxiliary hydrocarbon enters the reaction zone in an essentially unreacted state to result in a SSI less than zero. As stated earlier, the reaction zone as defined herein is located at a point starting at the location of injection of hydrocarbon feedstock and typically extending downstream to a point where the carbon black forming process is terminated by quenching. As a result of this process, the carbon blacks produced thereby exhibit lower structure levels, as indicated by decreases in dibutyl phthalate absorption numbers of greater than 5%, at a given surface area and lower surface areas, as indicated by decreases in iodine adsorption numbers of at least 3%, at a given overall combustion.

As referred to herein, the primary combustion represents the amount of oxidant such as air used in the first stage of the multi-staged process relative to the theoretical amount of oxidant required for the complete combustion of the first stage hydrocarbon to carbon dioxide and water. For purposes of convenience, the primary combustion is expressed in terms of a percentage. In cases where no hydrocarbon is fed to the first stage the primary combustion is infinite (%). Suitable hydrocarbon and oxidants are described hereinafter.

In the preparation of the hot first-stage gases employed in producing the carbon blacks of the present invention, there are preferably reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot first-stage gases are included any of the readily combustible gas, vapor, or liquid streams such as hydrogen, carbon monoxide, methane, acetylene, alcohols, kerosene. It is generally preferred, however, to utilize fuels having a high content of carbon-containing components and, in particular, hydrocarbons. For example, streams rich in methane such as natural gas and modified or enriched natural gas are excellent fuels as are other streams containing high amounts of hydrocarbons such as various hydrocarbon gases and liquids and refinery by-products including ethane, propane, butane, and pentane fractions, fuel oils and the like. Moreover, in the first stage of the preferred multi-staged furnace process, preheated air at temperatures typically ranging up to 1088K (1500° F.) is utilized as the oxidant and natural gas as the fuel in generating the primary combustion fire. While the primary combustion may range from 100% to %, the preferred percent primary or first-stage combustion range varies from about 140 to about 1000%.

In this manner there is generated a stream of hot gases flowing at an average velocity exceeding 30.5 m/sec. It has furthermore been found that a pressure differential between the combustion chamber and the reaction chamber of at least 6.9 kPa (1.0 p.s.i.), and preferably of about 10.3 kPa to 68.9 kPa (1.5 to 10 p.s.i.), is desirable. Under these conditions, there is produced a gaseous stream possessing sufficient energy to convert a carbon black-yielding hydrocarbonaceous feedstock to the desired carbon black products. The resultant gases emanating from the first stage attain temperatures of at least about 590 K (600° F.), with the most preferable temperatures being at least above about 1144K (1600° F.). The hot gases are propelled in a downstream direction and accelerated by introducing the gases into an enclosed feedstock injection stage of smaller diameter which may, if desired, be tapered or restricted such as a conventional venturi throat. It is at this point of the process, which may be considered the second stage, where the feedstock is preferentially injected into the stream of hot first-stage gases. Alternatively, feedstock may be injected at any point subsequent to the point where the first stage combustion, if any occurs, is complete.

More particularly, in the second stage where the first-stage gases are traveling at high velocity and there exists a gas kinetic head of at least above 6.9 kPa (1.0 p.s.i.), a suitable carbon black-yielding hydrocarbon feedstock is injected into the first-stage gases, under sufficient pressure to achieve desired penetration, thereby insuring a high rate of mixing and shearing of the first-stage gases and the hydrocarbon feedstock. Suitable for use herein as hydrocarbon feedstocks which are readily volatilizable under the conditions of the reaction are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like. The feedstock may be injected substantially transversely from the outer periphery of the stream of hot first-stage gases in the form of a plurality of coherent or atomized streams which penetrate into the interior regions of the stream of first-stage gases. Alternatively, the feedstock may be injected substantially axially or transversely from an inner periphery of the stream of hot first-stage gases in the form of a single or plurality of coherent or atomized streams. In the practice of the present invention, the hydrocarbon feedstock is preferably introduced as streams of liquid by forcing the liquid feedstock through a plurality of orifices having a diameter ranging from 0.25 cm to 0.508 cm (0.01 to 0.20 inch), and preferably ranging from 0.51 cm to 0.381 cm (0.02 to 0.15 inch), under an injection pressure sufficient to achieve the desired penetration and/or atomization. The amount of feedstock utilized will be adjusted in relation to the amounts of fuel and oxidant employed so as to result in an overall percent combustion for the carbon forming process ranging from about 10 to about 60 percent and preferably from about 15 to about 35 percent.

A third stage of the multi-staged process involves the provision of a reaction zone which will permit sufficient residence time for the carbon forming reaction to occur prior to termination of the reaction by quenching. In general, although the residence time in each instance depends upon the particular conditions and the particular black desired, the residence times of the present process vary from as low as 1 millisecond, or less, to above about 500 milliseconds. Accordingly, after the carbon forming reaction has proceeded for the desired period of time, the reaction is terminated by spraying thereon a quench liquid, such as water, issuing from at least one spray nozzle. The hot effluent gases containing the carbon black products suspended therein are then passed downstream to the conventional steps of cooling, separation and collection of the carbon black. The separation of the carbon black from the gas stream is readily accomplished by conventional means such as a precipitator, cyclone separator, bag filter, or combinations thereof.

Other and different objects, advantages and features of the present invention will become apparent to those skilled in the art upon consideration of the following detailed description and claims.

SUMMARY OF THE INVENTION

The process of the present invention is carried-out by adding auxiliary hydrocarbon to the reaction zone of the multi-staged carbon forming process and adjusting the primary combustion and overall combustion so that the SSI of the process is less than zero. A mathematical property of the structure sensitivity index is that if the surface area of carbon black is held constant by adding auxiliary hydrocarbon and removing feedstock, and if the structure, as measured by DBPA, decreases, and if introducing additional feedstock into the process with all other inputs held constant leads to production of lower surface area blacks, then the SSI must be less than zero. Furthermore, if the conditions presented above for having an SSI less than zero are met except that the structure, as measured by DBPA, increases, then the SSI is necessarily greater than zero.

For the purposes of the present invention, any amount of auxiliary hydrocarbon can be used provided that auxiliary hydrocarbon reaches &he reaction zone essentially unreacted. Generally, when using hydrocarbon as the auxiliary hydrocarbon, the %C of auxiliary hydrocarbon employed is less than about 60% by weight of the total carbon content of the reactants, and, when using hydrogen as the auxiliary hydrocarbon, the % H of auxiliary hydrocarbon employed is less than about 60% by weight of the total hydrogen content of the reactants. Preferably, when using a gaseous hydrocarbon as an auxiliary hydrocarbon, the amount is such that the % C of auxiliary hydrocarbon added will be less than 30%, and preferably less than 15%, of the total carbon input of the reactants, and, when using hydrogen as an auxiliary hydrocarbon, the amount is such that the % H of auxiliary hydrocarbon added will be less than 30%, and preferably less than 15%, of the total hydrogen input of the reactants.

The amount of auxiliary hydrocarbon employed herein, whether in gaseous or liquid form, is defined as the percentage of the total carbon (C) input of the reactants employed in carrying out the process, except when hydrogen is used as the auxiliary hydrocarbon, in which case the amount of auxiliary hydrocarbon is defined as the percentage of the total hydrogen (H) input of the reactants employed in carrying out the process. In particular, for hydrocarbons the amount& of auxiliary hydrocarbon used is determined by means of the following equation:

$$\% \ C \text{ of Auxiliary Hydrocarbon} = \frac{\text{lbs. } C \text{ in auxiliary hydrocarbon}}{\text{total lbs. } C \text{ of reactants}} \times 100$$

In this equation the total carbon input of the reactants represents the sum of the carbon input of the first-stage reactants, the carbon input of the feedstock and the carbon input of the auxiliary hydrocarbon. When hydrogen is the auxiliary hydrocarbon, the amount of auxiliary hydrocarbon used is determined by means of the following equation:

% H of Auxiliary Hydrocarbon =

$$\frac{\text{lbs. } H \text{ in auxiliary hydrocarbon}}{\text{total lbs. } H \text{ of reactants}} \times 100$$

In this equation the total hydrogen input of the reactants represents the sum of the hydrogen input of the first-stage reactants, the hydrogen input of the feedstock and the hydrogen input of the auxiliary hydrocarbon.

The present invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of the present invention in any way.

DETAILED DESCRIPTION OF THE INVENTION

Figure 1:
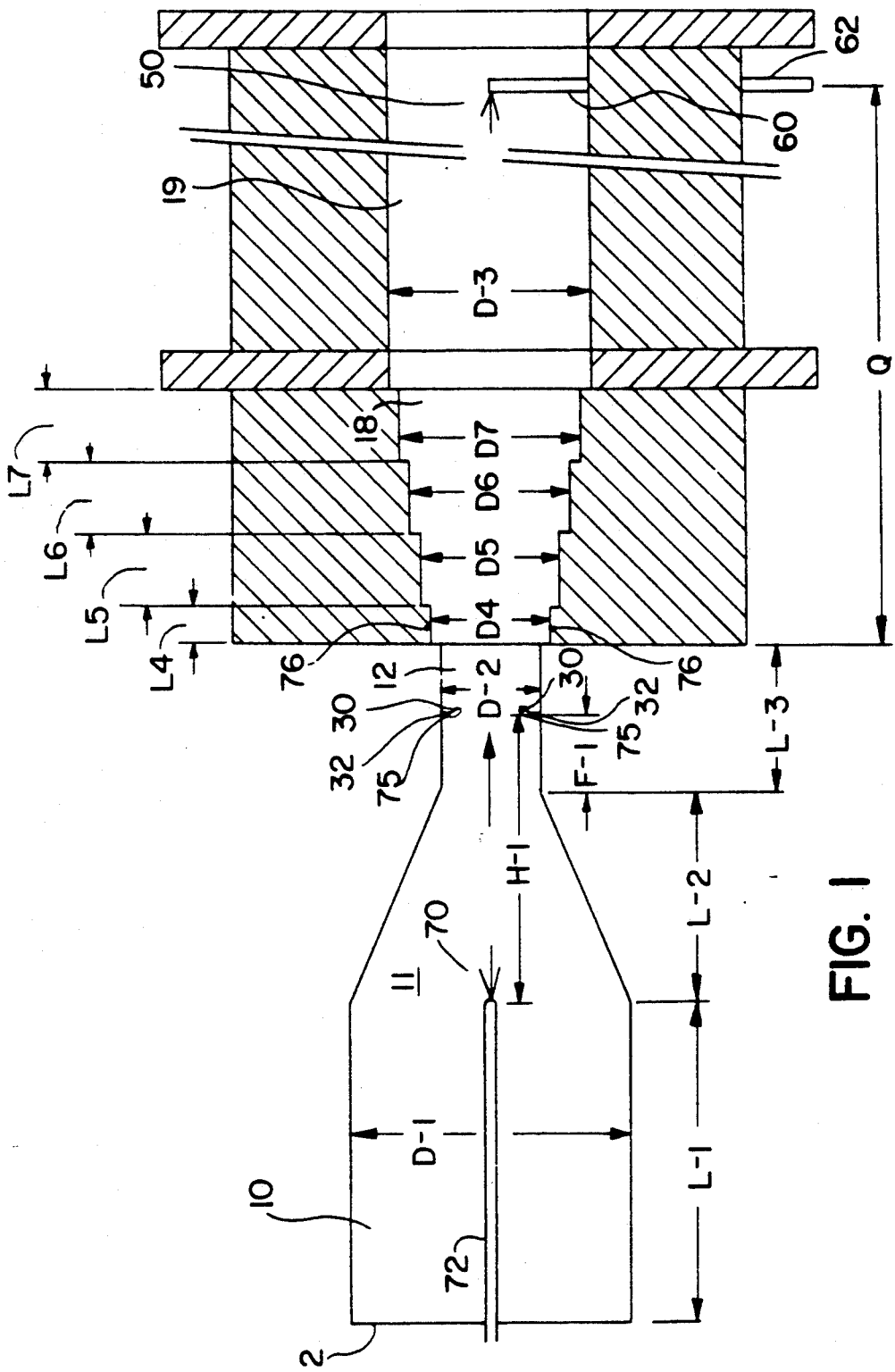
FIG. 1 is a cross-sectional view of a portion of one type of furnace carbon black reactor which may be utilized to produce the carbon blacks of the present invention.

FIG. 1 depicts one possible embodiment of the process of the present invention. Although a portion of one type of carbon black reactor is depicted in the figure, as previously explained, the present invention can be used in any multi-staged carbon black furnace reactor in which carbon black is made by pyrolysis and/or incomplete combustion of hydrocarbons.

Referring to FIG. 1, the process of the present invention may be performed in a furnace carbon black reactor 2, having a combustion zone 10, which has a zone of converging diameter 11, transition zone 12, entry section 18, and reaction zone 19. The diameter of the combustion zone 10, up to the point where the zone of converging diameter 11 begins, is shown as D-1; the diameter of zone 12, as D-2; the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6, and L-7.

The process of the present invention has been practiced using alternatively four reactor entry sections, 18, which are identified and defined further hereinafter.

To produce carbon blacks according to the process of the present invention, hot combustion gases may be generated in combustion zone 10, by contacting a liquid or gaseous fuel with a suitable oxidant stream such as. air, oxygen, mixtures of air and oxygen or the like. Alternatively, a preheated oxidant stream may be passed through combustion zone 10 without adding a liquid or gaseous fuel. Among the fuels suitable for use in contacting the oxidant stream in combustion zone 10 to generate the hot gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The ratio of air to natural gas utilized to produce the carbon blacks of the present invention may be from about 10:1 to infinity, when no natural gas is fed to the first stage. To facilitate the generation of hot gases, the oxidant stream may be preheated.

The hot gas stream flows downstream from zones 10 and 11 into zones 12, 18, and 19. The direction of the flow of hot gases is shown in the FIG. by the arrow. Carbon black-yielding feedstock 30 is introduced at point 32 (located in zone 12), and/or at point 70 (located in zone 11). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end of the zone of converging diameter 11 to point 32 is shown as F-1. Generally, carbon black-yielding feedstock 30 is injected in the form of a plurality of streams which penetrate into the interior regions of the hot first-stage gas stream to insure a high rate of mixing and shearing of the hot first-stage gases and the carbon black-yielding feedstock so as to rapidly and completely decompose and convert the feedstock to carbon black.

Auxiliary hydrocarbon is introduced at point 70 through probe 72 or through auxiliary hydrocarbon passages 75 in the walls which form the boundaries of zone 12 of the carbon black forming process or through auxiliary hydrocarbon passages 76 in the walls which form the boundaries of zones 18 and/or 19 of the carbon black forming process. In the practice of the present invention, auxiliary hydrocarbon may be introduced at an axial location between the point immediately after the initial combustion reaction of the first-stage fuel, if fuel is fed to the first stage, and the point immediately before the end of formation of carbon black provided that unreacted auxiliary hydrocarbon eventually enters the reaction zone. The distance from point 32 to point 70 is shown as H-1.

In the Examples described herein, the auxiliary hydrocarbon was introduced by four methods: as a plurality of streams that sheath the carbon black-yielding feedstock streams (75); as a plurality of streams at the outer periphery of zone 12 that are located between the primary carbon black-yielding feedstock plumes at the axial plane of introduction of the carbon black-yielding primary feedstock (75); as a plurality of transverse streams located near the center of zone 12 at the axial plane of feedstock injection (70), and through a plurality of streams at the periphery of zone 18 of the carbon-forming process (76). As will be noted, however, these are merely exemplary and are not limiting of the methods useable for introducing auxiliary hydrocarbon.

The mixture of carbon black-yielding feedstock and hot first-stage gases flows downstream through zone 12 into zone 18 and then into zone 19. Quench 60, located at point 62, injecting quenching fluid 50, which may be water, is utilized to stop chemical reaction when carbon blacks are formed. Point 62 may be determined in any manner known to the art for selecting the position of a quench to stop pyrolysis. One method for determining the position of the quench to stop pyrolysis is by determining the point at which an acceptable toluene extract level for the carbon black is reached. Toluene extract level may be measured by using ASTM Test D1618-83 "Carbon Black Extractables—Toluene Discoloration". Q is the distance from the beginning of zone 18 to quench point 62, and will vary according to the position of Quench 60.

After the mixture of hot first-stage gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in evaluating the analytical and physical properties of the blacks produced by the present invention.

Iodine Adsorption Number (I2 No.)—This is determined in accordance with ASTM D-1510-70.

Dibutyl Phthalate Absorption Number (DBPA) of Carbon Blacks— This is determined in accordance with ASTM Test Method D-24.4, as described earlier herein. The results reported are for carbon black in unpelletized form.

The effectiveness and advantages of the present invention will be further illustrated by the following examples.

EXAMPLES

To demonstrate the effectiveness of the present invention, experiments were conducted in a carbon black producing process in a reactor substantially described herein, and as depicted in FIG. 1 with the geometry set forth. In the examples presented hereinafter, four reactor entry sections, 18, are used. These reactor entry sections are identified hereinafter as reactor entry sections A, B, C, and D having the dimensions listed in Table 1 and depicted in FIG. 1.

TABLE 1

| Reactor Entry Sections, 18, Used in Examples. | | | | |
|---|---|---|---|---|
| Reactor Entry Section | A | B | C | D |
| D-4 (m) | 0.2286 | 0.2540 | 0.2642 | 0.089 |
| D-5 (m) | 0.3429 | 0.6858 | 0.4572 | 0.152 |
| D-6 (m) | 0.4699 | 0.6858 | 0.9144 | 0.152 |
| D-7 (m) | 0.5842 | 0.6858 | 0.9144 | 0.152 |
| L-4 (m) | 0.1727 | 0.3048 | 0.3048 | .0254 |
| L-5 (m) | 0.0559 | 0.1016 | 0.2286 | 0.0 |
| L-6 (m) | 0.7874 | 0.0 | 1.295 | 0.0 |
| L-7 (m) | 0.5588 | 0.0 | 0.0 | 0.0 |

For Examples 1 through 37 the auxiliary hydrocarbon was natural gas. For Examples 1 through 45 the primary fuel for the combustion reaction was natural gas. In all examples the natural gas fed to the carbon black forming process was at about ambient temperature of approximately 298 K (77° F.). The liquid feedstock utilized in Examples 1 through 40 was a commercially available feedstock having typical properties as listed in the second column of Table 2. The liquid feedstock utilized in Examples 41 through 45 was a commercially available feedstock having typical properties as listed in the third column of Table 2.

TABLE 2

| Properties of Primary Feedstock. | | |
|---|---|---|
| | Examples | |
| | 1–40 | 41–45 |
| H/C Ratio | 0.93 | 1.0 |
| Hydrogen (WT. %) | 7.19 | 7.59 |
| Carbon (WT. %) | 92.1 | 90.6 |
| Sulfur (WT. %) | 0.3 | 1.7 |
| Nitrogen (WT. %) | 0.41 | — |
| API Gravity - 288.6/288.6K | −1.6 | −2.3 |
| Specific Gravity 288.6/288.6K | 1.092 | 1.095 |
| Viscosity, @327.4K (m$^2$/s) | $2.7 \times 10^{-5}$ | $1.09 \times 10^{-4}$ |
| Viscosity, @371.9K (m$^2$/s) | $5.2 \times 10^{-6}$ | $1.09 \times 10^{-5}$ |
| BMCI (Visc-Grav) | 133 | 135 |

In examples 1 to 13 of Table 3, the present invention is demonstrated wherein surface area and structure decrease as auxiliary hydrocarbon is added at otherwise constant process flow rates. Two levels of primary combustion and two methods of introducing the auxiliary natural gas are illustrated in these examples.

EXAMPLES 1-5

Considering first Examples 1 through 5, the natural gas flow rate to the first-stage was 0.016 SCMS (2.5 KSCFH), the combustion air flow rate was 0.634 SCMS (85 KSCFH) and the combustion air preheat temperature was 755 K (900° F.). The resulting primary combustion level is estimated at about 400 percent. Example 1 represents a control run during which the carbon black yielding feedstock was introduced substantially transversely into the resultant stream of hot first-stage combustion gases at a flow rate of $1.9 \times 10^{-4}$ m$^3$/s (181 gph) through four 0.206 cm (0.081 inch) diameter orifices (32) located at the outer periphery of the stream of combustion gases. The resultant overall combustion level is estimated as 28.3 percent. Quenching with water occurred at a point about 7.93 meters (26 feet) downstream of the feedstock injection. There was obtained a carbon black having an iodine adsorption number of 72 mg/g and a DBPA of 141 cc/100g. In Example 2 the operating conditions were the same as those used in Example 1 except the overall combustion level was reduced in Example 2 to 26.4 percent by increasing the feedstock rate to $2.05\text{-}10^{-4}$ m$^3$/s (195 gph). The iodine adsorption number of the carbon black so-produced decreased to 60 mg/g and the DBPA was substantially unaffected. In Example 3, the same overall combustion level as in Example 2 was obtained by keeping the feedstock flow rate constant at $1.9 \times 10^{-4}$ m$^3$/s (181 gph), as in Example 1, but introducing auxiliary natural gas at a flow rate of 0.018 SCMS (2.4 KSCFH) through four 0.635 cm (0.25 inch) diameter orifices (75) located at the axial plane of feedstock injection between the feedstock streams. In contrast to the results of Example 2, a larger reduction in iodine adsorption number, to 43 mg/g, resulted and the DBPA was reduced to 125 cc/100g. An SSI of −5.65 is calculated from the iodine adsorption number and DBP values of Examples 1 to 3, as listed under Case A in Table 4.

In Example 4 the operating conditions from Example 1 were used except the overall combustion was further reduced to 25.4 percent by increasing the feedstock flow rate to $2.14 \times 10^{-4}$ m$^3$/s (203 gph). In Example 5, the same overall combustion level of Example 4 was obtained by instead adding 0.025 SCMS (3.4 KSCFH) of auxiliary natural gas through four 0.635 cm (0.25 inch) diameter orifices (75) located at the axial plane of feedstock injection between the feedstock streams. Auxiliary natural gas addition in Example 5 reduced the iodine adsorption number relative to Example 1 by about twice as much as feedstock addition in Example 4 and reduced DBPA by 15 cc/100g relative to Example whereas a 3 cc/100g DBPA increase occurred in Example 4 relative to Example 1 when additional feedstock was introduced. The SSI corresponding to these operating conditions is −3.50 as listed under Case B in Table 4.

EXAMPLES 6-9

In examples 6 through 9, 0.447 SCMS (60 KSCFH) of air preheated to 755 K (900° F.) and 0.014 SCMS (1.88 KSCFH) of natural gas at the ambient temperature of approximately 298 K (77° F.) were introduced to the first stage of the carbon black producing process. The resultant primary combustion is estimated as 325%. Examples 6 and 7 represent control runs that were made at two overall combustion levels without auxiliary natural gas. In Example 6 the carbon black yielding feedstock was introduced substantially transversely into the resultant stream of hot combustion gases at a rate of $1.43 \times 10^{-4}$ m$^3$/s (136 gph) through four 0.206 cm (0.08 inch) diameter orifices (32) located at the outer periphery of the stream of combustion gases. The resulting overall combustion was 26.1 percent and the reaction was quenched with water at a point 7.93 meters (26 feet) downstream of the location of feedstock injection. The resulting carbon black has an iodine adsorption number of 77 mg/g and a DBPA of 183 cc/100g. In Example 7, the overall combustion was reduced to 23.5 by increasing the feedstock flow rate to $1.60 \times 10^{-4}$ m$^3$/s (152 gph), while maintaining all other operating conditions constant, which resulted in an iodine adsorption number reduction to 55 mg/g and an increase in DBPA to 190 cc/100g. The operating conditions used for Example 8 were identical to those used for Example 6 except the overall combustion was reduced in Example 8 to 22.8 percent by introducing 0.025 SCMS (3.4 KSCFH) of auxiliary natural gas substantially transversely through four 0.635 cm (0.25 inch) diameter orifices (75) located between the feedstock streams at the plane of feedstock injection. The iodine adsorption number of the resulting carbon black is 30 mg/g and the DBP is 168 cc/100g. In Example 9, 0.039 SCMS (5.2 KSCFH) of auxiliary natural gas was added by the same method used in Example 8. The resulting carbon black has an iodine adsorption number of 16 mg/g and a DBPA of 148 cc/100g. The results listed in Examples 6 and 7 were used to calculate SAS$_{mf}$ and the results listed in Examples 8 and 9 combined with those of Example 6 were used to calculate SAS$_{ah}$ values listed in Table 4. These SAS values were then used to calculate the SSI values which are listed under cases C and D of Table 4. The SSI values listed therein are less than zero.

EXAMPLES 10-13

Examples 10 through 13 demonstrate that the process of the present invention is relatively insensitive to the location of auxiliary hydrocarbon addition into the carbon black forming process. In these examples, 0.447 SCMS (60 KSCFH) of air preheated to 755 K (900° F.) and 0.011 SCMS (1.52 KSCFH) of natural gas at ambient temperature of approximately 298 K (77° F.) were introduced into the combustion zone of the apparatus. The resultant primary combustion is estimated at 400 percent. Example 10 represents a control run during which the carbon black yielding feedstock was introduced substantially transversely into the resultant stream of hot combustion gases at a rate of $1.63 \times 10^{-4}$/s (155 gph) through four 0.226 cm (0.089 inch) diameter orifices (32) located at the outer periphery of the stream of combustion gases. The resulting overall combustion is estimated at 23.5 percent and the reaction was quenched with water at a point about 7.93 meters (26 feet) downstream of the plane of feedstock injection. The resulting carbon black has an iodine adsorption number of 48 mg/g and a DBPA of 179 cc/100g. The overall combustion was raised to 25.1 percent in Example 11 by reducing the feedstock flow rate to $1.53 \times 10^{-4}$m$^3$/s (145 gph) which produced a carbon black with an iodine adsorption number of 59 mg/g and a DBP of 169 cc/100g. In Example 12, the operating conditions were identical to those used in Example 10 except the overall combustion was reduced in Example 12 to 22.2 percent by introducing 0.011 SCMS (1.5 KSCFH) of auxiliary natural gas substantially transversely through nine 0.257 cm (0.101 inch) diameter orifices (76) spaced evenly around the circumference of the third stage of the present carbon black forming process and located approximately 25.4 cm (0 inches) downstream of the plane of feedstock injection. The conditions of Example 12 produced a carbon black with an iodine adsorption number of 34 mg/g and a DBPA of 165 cc/100g. The auxiliary natural gas flow rate was further increased in Example 13 to 0.022 SCMS (3.0 KSCFH), producing carbon black with an iodine adsorption number of 20 mg/g and a DBPA that was reduced to 139 cc/100g. The resulting SSI values for these examples are less than zero, as listed under cases E and F of Table 4.

TABLE 3
OPERATING CONDITIONS AND ANALYTICAL PROPERTIES OF CARBON BLACKS

| | 1 | 2 | 3 | 4 | 5 | 6 | 7 | 8 | 9 | 10 | 11 | 12 | 13 |
|---|---|---|---|---|---|---|---|---|---|---|---|---|---|
| D-1, m | 0.18 | 0.18 | 0.18 | 0.18 | 0.18 | 0.18 | 0.18 | 0.18 | 0.18 | 0.18 | 0.18 | 0.18 | 0.18 |
| D-2, m | 0.13 | 0.13 | 0.13 | 0.13 | 0.13 | 0.13 | 0.13 | 0.13 | 0.13 | 0.13 | 0.13 | 0.13 | 0.13 |
| D-3, m | 0.69 | 0.69 | 0.69 | 0.69 | 0.69 | 0.91 | 0.91 | 0.91 | 0.91 | 0.91 | 0.91 | 0.91 | 0.91 |
| L-1, m | 0.61 | 0.61 | 0.61 | 0.61 | 0.61 | 0.61 | 0.61 | 0.61 | 0.61 | 0.61 | 0.61 | 0.61 | 0.61 |
| L-2, m | 0.30 | 0.30 | 0.30 | 0.30 | 0.30 | 0.30 | 0.30 | 0.30 | 0.30 | 0.30 | 0.30 | 0.30 | 0.30 |
| L-3, m | 0.23 | 0.23 | 0.23 | 0.23 | 0.23 | 0.23 | 0.23 | 0.23 | 0.23 | 0.23 | 0.23 | 0.23 | 0.23 |
| F-1, m | 0.11 | 0.11 | 0.11 | 0.11 | 0.11 | 0.11 | 0.11 | 0.11 | 0.11 | 0.11 | 0.11 | 0.11 | 0.11 |
| H-1, m | n.a. | n.a. | n.a. | n.a. | n.a. | n.a. | n.a. | n.a. | n.a. | n.a. | n.a. | n.a. | n.a. |
| Q, m | 7.93 | 7.93 | 7.93 | 7.93 | 7.93 | 7.93 | 7.93 | 7.93 | 7.93 | 7.93 | 7.93 | 7.93 | 7.93 |
| Reactor Entry Section | "B" | "B" | "B" | "B" | "B" | "B" | "B" | "B" | "B" | "B" | "B" | "C" | "C" |
| Comb. Air, SCMS | 0.634 | 0.634 | 0.634 | 0.634 | 0.634 | 0.447 | 0.447 | 0.447 | 0.447 | 0.447 | 0.447 | 0.447 | 0.447 |
| Comb. Air Preheat, K | 755 | 755 | 755 | 755 | 755 | 755 | 755 | 755 | 755 | 755 | 755 | 755 | 755 |
| Burner Nat. Gas, SCMS | 0.016 | 0.016 | 0.016 | 0.016 | 0.016 | 0.014 | 0.014 | 0.014 | 0.014 | 0.011 | 0.011 | 0.011 | 0.011 |
| Air/Burn Gas Ratio | 9.7 | 9.7 | 9.7 | 9.7 | 9.7 | 9.7 | 9.7 | 9.7 | 9.7 | 9.7 | 9.7 | 9.7 | 9.7 |
| Feedstock Inj. Point, | 32 | 32 | 32 | 32 | 32 | 32 | 32 | 32 | 32 | 32 | 32 | 32 | 32 |
| Tips # × Size, cm | 4 × .206 | 4 × .206 | 4 × .206 | 4 × .206 | 4 × .206 | 4 × .206 | 4 × .206 | 4 × .206 | 4 × .206 | 4 × .226 | 4 × .178 | 4 × .226 | 4 × .226 |
| Feedstock Rate, m3/s | 1.90E-04 | 2.05E-04 | 1.90E-04 | 2.14E-04 | 1.90E-04 | 1.43E-04 | 1.60E-04 | 1.43E-04 | 1.43E-04 | 1.63E-04 | 1.53E-04 | 1.63E-04 | 1.63E-04 |
| Feedstock Pr., kPa | 248 | 283 | 241 | 303 | 297 | 117 | 145 | 117 | 117 | 117 | 262 | 117 | 117 |
| Feedstock Preheat, K | 399 | 397 | 393 | 397 | 393 | 395 | 392 | 395 | 396 | 397 | 395 | 399 | 407 |
| K+, gK+/m3 oil | 0.00 | 0.00 | 0.00 | 0.00 | 0.00 | 0.00 | 0.00 | 0.00 | 0.00 | 0.00 | 0.00 | 0.00 | 0.00 |
| Aux. Nat. Gas Inj. Point | n.a. | n.a. | 75 | n.a. | 75 | n.a. | n.a. | 75 | 75 | n.a. | n.a. | 76 | 76 |
| Orifices # × Size, cm | n.a. | n.a. | 4 × .635 | n.a. | 4 × .635 | n.a. | n.a. | 4 × .635 | 4 × .635 | n.a. | n.a. | 9 × .257 | 9 × .257 |
| Aux. Nat. Gas, SCMS | 0.000 | 0.000 | 0.018 | 0.000 | 0.025 | 0.000 | 0.000 | 0.025 | 0.039 | 0.000 | 0.000 | 0.011 | 0.022 |
| Quench Pressure, kPa | 917 | 945 | 862 | 938 | 876 | 435 | 490 | 455 | 448 | 559 | 628 | 586 | 579 |
| Quench Temperature, K | 1,002 | 1,007 | 1,011 | 1,004 | 1,005 | 1,004 | 1,006 | 1,006 | 1,005 | 1,006 | 1,004 | 1,005 | 1,004 |
| Primary Comb., % | 400 | 400 | 400 | 400 | 400 | 325 | 325 | 325 | 325 | 400 | 400 | 400 | 400 |
| Overall Comb., % | 28.3 | 26.4 | 26.2 | 25.4 | 25.4 | 26.1 | 23.5 | 22.8 | 21.4 | 23.5 | 25.1 | 22.2 | 21.1 |
| % C of Aux. Hydrocarbon | 0.0 | 0.0 | 4.5 | 0.0 | 6.3 | 0.0 | 0.0 | 8.2 | 12.0 | 0.0 | 0.0 | 3.4 | 6.5 |
| I2 No. (mg/g) | 72 | 60 | 43 | 54 | 36 | 77 | 55 | 30 | 16 | 48 | 59 | 34 | 20 |
| DBPA, cc/100 g | 141 | 140 | 125 | 144 | 126 | 183 | 190 | 168 | 148 | 179 | 169 | 164 | 139 |

Inj. = Injection;
Comb. = Combustion;
Aux. = Auxiliary;
Nat. = Natural;
Pr. = pressure;
m = meters;
cm = centimeters;
kPa = kiloPascal;
K = kelvin;
K+ = potassium;
n.a. = not applicable;
SCMS = standard cubic meters/second (273K, 101.3kPa);
gK+/m3 oil = grams K+/m3 of feedstock (oil)

TABLE 4

STRUCTURE SENSITIVITY INDEX

| | CASE | | | | | |
|---|---|---|---|---|---|---|
| | A | B | C | D | E | F |
| FEEDSTOCK ADDITION: | | | | | | |
| EXAMPLES | 1,2 | 1,4 | 6,7 | 6,7 | 10,11 | 10,11 |
| SAS (cc/100 mg) | 0.083 | −0.167 | −0.318 | −0.318 | −0.909 | −0.909 |
| AUXILIARY HYDROCARBON ADDITION: | | | | | | |
| EXAMPLES | 1,3 | 1,5 | 6,8 | 6,9 | 10,12 | 10,13 |
| SAS (cc/100 mg) | 0.552 | 0.417 | 0.319 | 0.573 | 1.000 | 1.430 |
| STRUCTURE SENSITIVITY INDEX (SSI) | −5.65 | −3.50 | −2.00 | −2.80 | −2.10 | −2.57 |

Note: Numbers listed in Rows 1 and 3 labeled "EXAMPLES" correspond to the examples used to calculate values for the SAS's listed in Rows 2 and 4, respectively. The SAS values were used in turn to calculate the SSI values shown in Row 5.

Examples 14 through 27 demonstrates that the SSI is less than zero when practicing the present invention using varying auxiliary hydrocarbon injection methods and operating at varying primary and overall combustions. In these examples, iodine adsorption number is held approximately constant by adding auxiliary hydrocarbon, which tends to reduce carbon black surface area, and by simultaneously reducing the feedstock flow rate, which tends to increase the carbon black surface area. In all cases, the structure, as measured by DBPA, decreases when auxiliary hydrocarbon is added in place of feedstock. Furthermore, removing feedstock while holding all other flow rates and the reactor configuration constant results in higher surface area as measured by iodine adsorption number. Therefore, the mathematical conditions, described hereinbefore, that insure a value of the SSI that is less than zero are met by all of the reactor operations used in Examples $14 \geq 27$.

EXAMPLES 14-17

Specifically, in Examples 14 through 17, listed in Table 5, 0.447 SCMS (60 KSCFH) of air preheated to 755 K (900° F.) and 0.011 SCMS (1.52 KSCFH) of natural gas at ambient temperature of approximately 298 K (77° F.) were introduced to the first stage of the carbon black forming process. In Example 14, the carbon black yielding feedstock was introduced substantially transversely into the resultant stream of hot combustion gases at a rate of $1.65 \times 10^{-4}$ m³/s (157 gph) through six 0.127 cm (0.050 inch) diameter orifices (32) located at the outer periphery of the stream of combustion gases. A potassium concentration of 0.74 g/m³ (0.3 g/100 gal) was maintained in the feedstock by adding an aqueous potassium acetate solution. The resultant overall combustion is estimated at 23.4 percent and the reaction was quenched with water at a point 7.93 meters (26 feet) downstream of the plane of feedstock injection. Carbon black with an iodine adsorption number of 35 mg/g and a DBPA of 130 cc/100 g was produced by the operating conditions of Example 14. This black is used herein as a control run since no auxiliary hydrocarbon was added.

In Examples 15 through 17 the procedure of Example 14 was followed in every respect except that the % C (carbon) of auxiliary hydrocarbon was raised from the zero control case to sequentially 2.6%, 6.0% and 10.4% while maintaining iodine adsorption number approximately constant by adding auxiliary hydrocarbon and decreasing the feedstock flow rate. Auxiliary hydrocarbon was added as a sheath (75) of natural gas around the feedstock tips. The %C of auxiliary hydrocarbon was raised to 2.6% in Example 15 by reducing the feedstock rate to $1.44 \times 10^{-4}$ m³/s (137 gph) and adding 0.007 SCMS (1.0 KSCFH) of auxiliary hydrocarbon which resulted in an increase of the overall combustion from 23.4 to 25.0 percent. In Example 16, the overall combustion was raised to 26.2 percent while keeping surface area approximately constant by reducing the feedstock flow rate to $1.29 \times 10^{-4}$ m³/s (123 gph) and increasing the auxiliary natural gas flow rate to 0.016 SCMS (2.2 KSCFH). In Example 17, the overall combustion was raised to 28.2 percent by further reducing the feedstock flow rate to $1.09 \times 10^{-4}$ m³/s (104 gph) and increasing the auxiliary natural gas rate to 0.025 SCMS (3.4 KSCFH). The results listed in Examples 14 through 17 demonstrate that the DBPA is continuously reduced from the Example 15 control case value of 130 cc/100g to 112, 110, and 100 cc/100 g, as the percentage of auxiliary natural gas is increased. As discussed above, the SSI values for these reactor operations are mathematically proven to be less than zero.

EXAMPLES 18-19

Example 18 is a control run during which the carbon black yielding feedstock was introduced substantially transversely into the resultant stream of hot combustion gases at a rate of $1.63 \times 10^{-4}$ m³/s (155 gph) through four 0.226 cm (0.089 inch) diameter orifices (32) located at the outer periphery of the stream of hot combustion gases. The first-stage combustion conditions used in Example 18 were the same as those used in Example 14. A potassium concentration of 13.2 g/m³ (5.0 g/100gal) was maintained in the feedstock by adding an aqueous potassium acetate solution. The resultant overall combustion level is estimated at 23.5 percent and the reaction was quenched with water addition at a point 7.93 meters (26 feet) downstream of the plane of feedstock injection. A reference carbon black having an iodine adsorption number of 49 mg/g and a DBPA of 101 cc/100g was produced. In Example 19, the %C of auxiliary hydrocarbon was raised from zero, in Example 18, to 4.0 percent while maintaining a constant iodine adsorption number by reducing the feedstock rate to $1.35 \times 10^{-4}$ m³/s (128 gph) and introducing 0.011 SCMS (1.5 KSCFH) of auxiliary hydrocarbon substantially transversely through four 0.635 cm (0.25 inch) diameter orifices (75) located between the feedstock streams at the plane of feedstock injection. Raising the %C at constant iodine adsorption number in this way produced a carbon black with a DBPA of 78 cc/100 g which is about 23 points lower than the control case of Example 18.

TABLE 5
OPERATING CONDITIONS AND ANALYTICAL PROPERTIES OF CARBON BLACKS

| | Example Number | | | | | |
|---|---|---|---|---|---|---|
| | 14 | 15 | 16 | 17 | 18 | 19 |
| D-1, m | 0.18 | 0.18 | 0.18 | 0.18 | 0.18 | 0.18 |
| D-2, m | 0.11 | 0.11 | 0.11 | 0.11 | 0.13 | 0.13 |
| D-3, m | 0.69 | 0.69 | 0.69 | 0.69 | 0.91 | 0.91 |
| L-1, m | 0.61 | 0.61 | 0.61 | 0.61 | 0.61 | 0.61 |
| L-2, m | 0.30 | 0.30 | 0.30 | 0.30 | 0.30 | 0.30 |
| L-3, m | 0.23 | 0.23 | 0.23 | 0.23 | 0.23 | 0.23 |
| F-1, m | 0.11 | 0.11 | 0.11 | 0.11 | 0.11 | 0.11 |
| H-1, m | n.a. | n.a. | n.a. | n.a. | n.a. | n.a. |
| Q, m | 7.93 | 7.93 | 7.93 | 7.93 | 7.93 | 7.93 |
| Reactor Entry Section | "A" | "A" | "A" | "A" | "B" | "B" |
| Comb. Air, SCMS | 0.447 | 0.447 | 0.447 | 0.447 | 0.447 | 0.447 |
| Comb. Air Preheat, K | 755 | 755 | 755 | 755 | 755 | 755 |
| Burner Nat. Gas, SCMS | 0.011 | 0.011 | 0.011 | 0.011 | 0.011 | 0.011 |
| Air/Burn Gas Ratio | 9.7 | 9.7 | 9.7 | 9.7 | 9.7 | 9.7 |
| Feedstock Inj. Point,) | 32 | 32 | 32 | 32 | 32 | 32 |
| Tips # × Size, cm) | 6 × .127 | 6 × .127 | 6 × .127 | 6 × .127 | 4 × .226 | 4 × .226 |
| Feedstock Rate, m3/s | 1.65E-04 | 1.44E-04 | 1.29E-04 | 1.09E-04 | 1.63E-04 | 1.35E-04 |
| Feedstock Pr., kPa | 628 | 497 | 386 | 248 | 97 | 69 |
| Feedstock Preheat, K | 401 | 396 | 390 | 402 | 375 | 384 |
| K+, gK+/m3 oil | 0.74 | 0.74 | 0.74 | 0.74 | 13.20 | 13.20 |
| Aux. Nat. Gas Inj. Point | n.a. | 75 | 75 | 75 | n.a. | 75 |
| Orifices # × Size, cm) | n.a. | 6 × .356 | 6 × .356 | 6 × .356 | n.a. | 4 × .635 |
| Aux. Nat. Gas, SCMS | 0.000 | 0.007 | 0.016 | 0.025 | 0.000 | 0.011 |
| Quench Pressure, kPa | 572 | 566 | 566 | 517 | 517 | 476 |
| Quench Temperature, K | 1,005 | 1,003 | 1,005 | 1,004 | 1,006 | 1,006 |
| Primary Comb., % | 400 | 400 | 400 | 400 | 400 | 400 |
| Overall Comb., % | 23.4 | 25.0 | 26.2 | 28.2 | 23.5 | 26.3 |
| % C of Aux. Hydrocarbon | 0.0 | 2.6 | 6.0 | 10.4 | 0.0 | 4.0 |
| I2 No. (mg/g) | 35 | 34 | 36 | 37 | 49 | 50 |
| DBPA, cc/100 g | 130 | 112 | 110 | 100 | 101 | 78 |

Inj. = Injection; Comb. = Combustion; Aux. = Auxiliary; Nat. = Natural; Pr. = pressure; m = meters; cm = centimeters; kPa = kiloPascal; K = kelvin; K+ = potassium; n.a. = not applicable; SCMS = standard cubic meters/second (273K, 101.3kPa); gK+/m3 oil = grams K+/m3 of feedstock (oil)

Examples 20 through 27, listed in Table 6, demonstrate that primary combustion levels less than those used in Examples through 19 are also suitable for operation of the present process under conditions wherein the SSI is less than zero.

EXAMPLES 20-25

In Examples 20 through 25, low structure carbon blacks are produced at constant iodine adsorption numbers by increasing the auxiliary natural gas flow rate and simultaneously reducing the feedstock flow rate while operating at 250% primary combustion. Example 20 is a control run during which 0.634 SCMS (85 KSCFH) of air preheated to 755 K (900° F.) and 0.026 SCMS (3.5 KSCFH) of natural gas at ambient temperature of approximately 298 K (77° F.) were introduced to the first stage. The resultant primary combustion is estimated at 250 percent. The carbon black yielding feedstock was introduced substantially transversely into the resultant stream of hot combustion gases at a rate of 2.49×10$^{-4}$ m$^3$/s (237 gph) through four 0.206 cm (0.081 inch) diameter orifices (32) located at the outer periphery of the stream of hot combustion gases. A potassium concentration of 26.93 g/m$^3$ (10.2 g/100 gal) was maintained in the feedstock by adding an aqueous potassium acetate solution. The resultant overall combustion is estimated at 21.1 percent and the reaction was quenched with water addition at a point about 7.93 meters (26 feet) downstream of the plane of feedstock injection. A reference carbon black having an iodine adsorption number of 49 mg/g and a DBPA of 122 cc/100g was obtained. In Example 2, the procedure of Example 20 was followed except that the %C of auxiliary hydrocarbon was raised in Example 21 to 9.2% by adding 0.036 SCMS (4.8 KSCFH) of auxiliary natural gas and the feedstock flow rate was simultaneously reduced to 1.74×10$^{-4}$ m$^3$/s (165 gph) in order to maintain surface area approximately constant. Auxiliary hydrocarbon was added substantially transversely through four 0.635 cm (0.25 inch) diameter orifices (75) located between the feedstock streams at the plane of feedstock injection. The resultant carbon black has a structure, as measured by DBPA, of 76 cc/100 g.

Example 22 is a control case that was carried out under the conditions of Example 20 except that the feedstock rate was reduced to 2.22×10$^{-4}$m$^3$/s (211 gph) resulting in an increase in the estimated overall combustion level to 23.5 percent. This operation produced a reference carbon black having an iodine adsorption number of 60 mg/g and a DBPA of 02 cc/100g. In Example 23, iodine adsorption number was kept approximately constant at 60 mg/g while the %C of auxiliary hydrocarbon was raised to 8.4% by increasing the auxiliary natural gas flow rate to 0.031 SCMS (4.1 KSCFH) and reducing the feedstock flow rate to 1.63×10$^{-4}$ m$^3$/s (155 gph). Auxiliary natural gas was introduced substantially transversely through four 0.635 cm (0.25 inch) diameter orifices (75) located between the feedstock streams at the plane of feedstock injection. The resultant overall combustion level is estimated at 27%. The structure of the carbon black so produced was reduced to 79 cc/100g.

The control run of Example 24 was performed using approximately the same operating conditions of Example 20 and produced a similar carton black having an iodine adsorption number of 47 mg/g and a DBPA of 122 cc/100g. The conditions of Example 24 were used in Example 25 except that the %C of auxiliary hydrocarbon was raised to 5.0 percent by adding 0.022 SCMS (2.9 KSCFH) of auxiliary natural gas substantially transversely through six 0.345 cm (0.136 inch) diameter orifices evenly spaced around the circumference of a centrally located probe (72) while maintaining a constant iodine adsorption number by reducing the feedstock flow rate to $2.03 \times 10^{-4}$ m³/s (193 gph). The resultant carbon black has a DBPA of 100 cc/100 g.

while maintaining a constant iodine adsorption number by reducing the feedstock flow rate to $9.79 \times 10^{-5}$ m³/s (93 gph). The DBPA of the resultant carbon black was reduced to 99 cc/100 g.

TABLE 6

OPERATING CONDITIONS AND ANALYTICAL PROPERTIES OF CARBON BLACKS

| | Example Number | | | | | |
|---|---|---|---|---|---|---|
| | 20 | 21 | 22 | 23 | 24 | 25 |
| D-1, m | 0.18 | 0.18 | 0.18 | 0.18 | 0.18 | 0.18 |
| D-2, m | 0.13 | 0.13 | 0.13 | 0.13 | 0.13 | 0.13 |
| D-3, m | 0.91 | 0.91 | 0.91 | 0.91 | 0.91 | 0.91 |
| L-1, m | 0.61 | 0.61 | 0.61 | 0.61 | 0.61 | 0.61 |
| L-2, m | 0.30 | 0.30 | 0.30 | 0.30 | 0.30 | 0.30 |
| L-3, m | 0.23 | 0.23 | 0.23 | 0.23 | 0.23 | 0.23 |
| F-1, m | 0.11 | 0.11 | 0.11 | 0.11 | 0.11 | 0.11 |
| H-1, m | n.a. | n.a. | n.a. | n.a. | n.a. | 0.00 |
| Q, m | 7.93 | 7.93 | 7.93 | 7.93 | 7.93 | 7.93 |
| Reactor Entry Section | "B" | "B" | "B" | "B" | "B" | "B" |
| Comb. Air, SCMS | 0.634 | 0.634 | 0.634 | 0.634 | 0.634 | 0.634 |
| Comb. Air Preheat, K | 755 | 755 | 755 | 755 | 755 | 755 |
| Burner Nat. Gas, SCMS | 0.026 | 0.026 | 0.026 | 0.026 | 0.026 | 0.026 |
| Air/Burn Gas Ratio | 9.7 | 9.7 | 9.7 | 9.7 | 9.7 | 9.7 |
| Feedstock Inj. Point,) | 32 | 32 | 32 | 32 | 32 | 32 |
| Tips # × Size, cm) | 4 × .206 | 4 × .160 | 4 × .206 | 4 × .160 | 4 × .206 | 4 × .185 |
| Feedstock Rate, m3/s | 2.49E-04 | 1.74E-04 | 2.22E-04 | 1.63E-04 | 2.49E-04 | 2.03E-04 |
| Feedstock Pr., kPa | 372 | 510 | 290 | 531 | 428 | 448 |
| Feedstock Preheat, K | 384 | 390 | 386 | 390 | 395 | 407 |
| K+, gK+/m3 oil | 26.93 | 26.93 | 26.93 | 26.93 | 26.93 | 26.93 |
| Aux. Nat. Gas Inj. Point) | n.a. | 75 | n.a. | 75 | n.a. | 70 |
| Orifices # × Size, cm) | n.a. | 4 × .635 | n.a. | 4 × .635 | n.a. | 6 × .345 |
| Aux. Nat. Gas, SCMS | 0.000 | 0.036 | 0.000 | 0.031 | 0.000 | 0.022 |
| Quench Pressure, kPa | 773 | 697 | 821 | 745 | 828 | 773 |
| Quench Temperature, K | 1,005 | 1,007 | 1,005 | 1,006 | 1,008 | 1,009 |
| Primary Comb., % | 250 | 250 | 250 | 250 | 250 | 250 |
| Overall Comb., % | 21.1 | 25.2 | 23.5 | 27.0 | 21.2 | 23.5 |
| % C of Aux. Hydrocarbon | 0.0 | 9.2 | 0.0 | 8.4 | 0.0 | 5.0 |
| I2 No. (mg/g) | 49 | 47 | 60 | 61 | 47 | 47 |
| DBPA, cc/100 g | 122 | 76 | 102 | 79 | 122 | 100 |

Inj. = Injection; Comb. = Combustion; Aux. = Auxiliary; Nat. = Natural; Pr. = pressure; m = meters; cm = centimeters; kPa = kiloPascal; K = kelvin; K+ = potassium; n.a. = not applicable; SCMS = standard cubic meters/second (273K, 101.3kPa); gK+/m3 oil = grams K+/m3 of feedstock (oil)

EXAMPLES 26-27

Examples 26 and 27 of Table 7 demonstrate the present invention at 47% primary combustion. In Example 26, 0.447 SCMS (60 KSCFH) of air preheated to a temperature of 755 K (900° F.) and 0.031 SCMS (4.2 KSCFH) of natural gas at ambient temperature of approximately 298 K (77° F.) were introduced to the first stage combustion zone. The carbon black yielding feedstock was introduced substantially transversely into the resultant stream of hot combustion gases at a rate of $1.64 \times 10^{-4}$ m³/s (156 gph) through four 0.185 cm (0.073 inch) diameter orifices (32) located at the outer periphery of the stream of hot combustion gases. A potassium concentration of 43.82 g/m³ (16.6 g/100gal) was maintained in the feedstock by adding an aqueous potassium acetate solution. The resultant overall combustion is estimated at 21.2 percent and the reaction was quenched with water addition at a point about 7.93 meters (26 feet) downstream of the plane of feedstock injection. A reference carbon black having an iodine adsorption number of 61 mg/g and a DBPA of 122 cc/100g was produced. In Example 27, the operating conditions of Example 26 were used except that the %C of auxiliary hydrocarbon was increased to 14.2 percent by introducing 0.036 SCMS (4.8 KSCFH) of auxiliary natural gas substantially transversely through four 0.635 cm (0.25 inch) diameter orifices (75) between the feedstock streams at the axial plane of feedstock injection

TABLE 7

OPERATING CONDITIONS AND ANALYTICAL PROPERTIES OF CARBON BLACKS

| | Example Number | |
|---|---|---|
| | 26 | 27 |
| D-1, m | 0.18 | 0.18 |
| D-2, m | 0.13 | 0.13 |
| D-3, m | 0.91 | 0.91 |
| L-1, m | 0.61 | 0.61 |
| L-2, m | 0.30 | 0.30 |
| L-3, m | 0.23 | 0.23 |
| F-1, m | 0.11 | 0.11 |
| H-1, m | n.a. | n.a. |
| Q, m | 7.93 | 7.93 |
| Reactor Entry Section | "B" | "B" |
| Comb. Air, SCMS | 0.447 | 0.447 |
| Comb. Air Preheat, K | 755 | 755 |
| Burner Nat. Gas, SCMS | 0.031 | 0.031 |
| Air/Burn Gas Ratio | 9.7 | 9.7 |
| Feedstock Inj. Point,) | 32 | 32 |
| Tips # × Size, cm) | 4 × .185 | 4 × .140 |
| Feedstock Rate, m3/s | 1.64E-04 | 9.79E-05 |
| Feedstock Pr., kPa | 290 | 324 |
| Feedstock Preheat, K | 417 | 407 |
| K+, gK+/m3 oil | 43.82 | 43.82 |
| Aux. Nat. Gas Inj. Point) | n.a. | 75 |
| Orifices # × Size, cm) | n.a. | 4 × .635 |
| Aux. Nat. Gas, SCMS | 0.000 | 0.036 |
| Quench Pressure, kPa | 607 | 559 |
| Quench Temperature, K | 1,005 | 1,005 |
| Primary Comb., % | 147 | 147 |
| Overall Comb., % | 21.2 | 25.9 |
| % C of Aux. Hydrocarbon | 0.0 | 14.2 |
| I2 No. (mg/g) | 61 | 60 |

TABLE 7-continued
OPERATING CONDITIONS AND ANALYTICAL PROPERTIES OF CARBON BLACKS

| | Example Number | |
|---|---|---|
| | 26 | 27 |
| DBPA, cc/100 g | 122 | 99 |

Inj. = Injection; Comb. = Combustion; Aux. = Auxiliary; Nat. = Natural; Pr. = pressure; m = meters; cm = centimeters; kPa = kiloPascal; K = kelvin; K+ = potassium; n.a. = not applicable; SCMS = standard cubic meters/second (273K, 101.3kPa); gK+/m3 oil = grams K+/m3 of feedstock (oil)

Examples 28 through 37, listed in Table 8, demonstrate the ability of the present process to produce an SSI that is less than zero regardless of the feedstock atomization or injection method. Examples 28 through 32 demonstrate the present process using substantially transverse, pressure atomized feedstock injection. Examples 33 through 37 consider substantially axial, pressure atomized feedstock injection. These examples compare feedstock injection versus auxiliary hydrocarbon addition for lowering iodine adsorption number and DBPA.

EXAMPLES 28-32

In Examples 28 through 32, 0.447 SCMS (60 KSCFH) of air at a temperature of 755 K (900° F.) and 0.011 SCMS (1.52 KSCFH) of natural gas at ambient temperature of approximately 298 K (77° F.) are introduced to the first stage. The resultant primary combustion is estimated at 400%. In these examples the carbon black yielding feedstock was introduced substantially transversely through four 0.079 cm (0.031 inch) diameter orifices (32) each equipped with spinner inserts which facilitate atomization by imparting an angular velocity component to the feedstock entering the process. In examples 28, 29, and 31, the feedstock flow rate was increased from $1.26 \times 10^{-4}$ m$^3$/s (120 gph), to $1.40 \times 10^{-4}$ m$^3$/s (133 gph), to $1.54 \times 10^{-4}$ m$^3$/s (146 gph) respectively in order to demonstrate the response of surface area and structure to changes in feedstock flow rate without auxiliary hydrocarbon addition. In examples 30 and 32, auxiliary natural gas was added through four 0.635 cm (0.25 inch) diameter orifices (75) located at the outer periphery of the stream of first-stage combustion gases at flow rates of 0.015 SCMS (2.0 KSCFH) and 0.029 SCMS (3.9 KSCFH) respectively. The feedstock flow rate was constant at $1.26 \times 10^{-4}$ m$^3$/s (120 gph), which was the flow rate used in Example 28.

The resulting SSI's from Examples 28 through 32 are listed in Table 9 under cases G and H. The SSI's are less than zero, demonstrating that the present invention can be practiced regardless of whether an atomized or a coherent feedstock stream enter the reaction zone.

EXAMPLES 33-37

The procedures of Examples 28 through 32 were repeated in Examples 33 through 37 respectively except that the feedstock was injected into the process in a substantially axial downstream direction through a 0.305 cm (0.120 inch) diameter pressure atomizing oil tip (70) discharging from the end of probe 72, which was retracted approximately 0.25 m (0 inches) from the axial midpoint of the second stage of the present process. The oil tip was Monarch spray tip number F-94-120-45 purchased from Monarch Manufacturing (Phila., PA., USA).

The resulting SSI's from Examples 33 through 37 are listed in Table 9 under cases I and J. The SSI's are less than zero, demonstrating that the present invention can be practiced regardless of whether an axial or a transverse feedstock stream enter the reaction zone. It is expected that any other commercial methods for feedstock injection and atomization would also be suitable for use in conjunction with the present invention and therefore the process of the present invention is not limited to any particular method of introducing feedstock into the carbon forming process.

TABLE 8
OPERATING CONDITIONS AND ANALYTICAL PROPERTIES OF CARBON BLACKS

| | \multicolumn{10}{c}{Number} |
|---|---|---|---|---|---|---|---|---|---|---|
| | 28 | 29 | 30 | 31 | 32 | 33 | 34 | 35 | 36 | 37 |
| D-1, m | 0.18 | 0.18 | 0.18 | 0.18 | 0.18 | 0.18 | 0.18 | 0.18 | 0.18 | 0.18 |
| D-2, m | 0.13 | 0.13 | 0.13 | 0.13 | 0.13 | 0.13 | 0.13 | 0.13 | 0.13 | 0.13 |
| D-3, m | 0.69 | 0.69 | 0.69 | 0.69 | 0.69 | 0.69 | 0.69 | 0.69 | 0.69 | 0.69 |
| L-1, m | 0.61 | 0.61 | 0.61 | 0.61 | 0.61 | 0.61 | 0.61 | 0.61 | 0.61 | 0.61 |
| L-2, m | 0.30 | 0.30 | 0.30 | 0.30 | 0.30 | 0.30 | 0.30 | 0.30 | 0.30 | 0.30 |
| L-3, m | 0.23 | 0.23 | 0.23 | 0.23 | 0.23 | 0.23 | 0.23 | 0.23 | 0.23 | 0.23 |
| F-1, m | 0.11 | 0.11 | 0.11 | 0.11 | 0.11 | 0.11 | 0.11 | 0.11 | 0.11 | 0.11 |
| H-1, m | n.a. | n.a. | n.a. | n.a. | n.a. | n.a. | n.a. | n.a. | n.a. | n.a. |
| Q, m | 7.93 | 7.93 | 7.93 | 7.93 | 7.93 | 7.93 | 7.93 | 7.93 | 7.93 | 7.93 |
| Reactor Entry Section | "B" | "B" | "B" | "B" | "B" | "B" | "B" | "B" | "B" | "B" |
| Comb. Air, SCMS | 0.477 | 0.477 | 0.477 | 0.477 | 0.477 | 0.477 | 0.477 | 0.477 | 0.477 | 0.477 |
| Comb. Air Preheat, K | 755 | 755 | 755 | 755 | 755 | 755 | 755 | 755 | 755 | 755 |
| Burner Nat. Gas, SCMS | 0.011 | 0.011 | 0.011 | 0.011 | 0.011 | 0.011 | 0.011 | 0.011 | 0.011 | 0.011 |
| Air/Burn Gas Ratio | 9.7 | 9.7 | 9.7 | 9.7 | 9.7 | 9.7 | 9.7 | 9.7 | 9.7 | 9.7 |
| Feedstock Inj. Point,) | 32 | 32 | 32 | 32 | 32 | 70 | 70 | 70 | 70 | 70 |
| Tips # × Size, cm) | 4 × .079 | 4 × .079 | 4 × .079 | 4 × .079 | 4 × .079 | 1 × .305 | 1 × .305 | 1 × .305 | 1 × .305 | 1 × .305 |
| Feedstock Rate, m3/s | 1.26E-04 | 1.40E-04 | 1.26E-04 | 1.54E-04 | 1.26E-04 | 1.26E-04 | 1.40E-04 | 1.26E-04 | 1.54E-04 | 1.26E-04 |
| Feedstock Pr., kPa | 2,552 | 3,104 | 2,531 | 3,773 | 2,524 | 1,448 | 1,766 | 1,448 | 2,138 | 1,442 |
| Feedstock Preheat, K | 402 | 400 | 402 | 401 | 402 | 400 | 403 | 404 | 401 | 404 |
| K+, gK+/m3 oil | 0.00 | 0.00 | 0.00 | 0.00 | 0.00 | 0.00 | 0.00 | 0.00 | 0.00 | 0.00 |
| Aux. Nat. Gas Inj. Point) | n.a. | n.a. | 75 | n.a. | 75 | n.a. | n.a. | 75 | n.a. | 75 |
| Orifices # × Size, cm) | n.a. | n.a. | 4 × .635 | n.a. | 4 × .635 | n.a. | n.a. | 4 × .635 | n.a. | 4 × .635 |
| Aux. Nat. Gas, SCMS | 0.000 | 0.000 | 0.015 | 0.000 | 0.029 | 0.000 | 0.000 | 0.015 | 0.000 | 0.029 |
| Quench Pressure, kPa | 559 | 572 | 572 | 600 | 572 | 517 | 607 | 586 | 607 | 572 |
| Quench Temperature, K | 1,007 | 1,004 | 1,005 | 1,007 | 1,005 | 1,008 | 1,004 | 1,009 | 1,006 | 1,010 |
| Primary Comb., % | 400 | 400 | 400 | 400 | 400 | 400 | 400 | 400 | 400 | 400 |
| Overall Comb., % | 30.0 | 27.2 | 27.3 | 25.0 | 25.2 | 30.0 | 27.2 | 27.3 | 25.0 | 25.2 |
| % C of Aux. Hydrocarbon | 0.0 | 0.0 | 5.6 | 0.0 | 10.4 | 0.0 | 0.0 | 5.6 | 0.0 | 10.4 |
| I2 No. (mg/g) | 96 | 81 | 59 | 66 | 33 | 74 | 64 | 57 | 53 | 39 |
| DBPA, cc/100 g | 170 | 184 | 173 | 184 | 156 | 147 | 179 | 173 | 179 | 155 |

Inj. = Injection;
Comb. = Combustion;
Aux. = Auxiliary;
Nat. = Natural;
Pr. = pressure;
m = meters;
cm = centimeters;
kPa = kiloPascal;
K = kelvin;
K+ = potassium;
n.a. = not applicable;
SCMS = standard cubic meters/second (273K, 101.3kPa);
gK+/m3 oil = grams K+/m3 of feedstock (oil)

TABLE 9

STRUCTURE SENSITIVITY INDEX

| | CASE | | | |
|---|---|---|---|---|
| | G | H | I | J |
| FEEDSTOCK ADDITION: | | | | |
| EXAMPLES | 28,29 | 28,31 | 33,34 | 33,36 |
| SAS (cc/100 mg) | −0.933 | −0.468 | −3.200 | −1.524 |
| AUXILIARY HYDRO-CARBON ADDITION: | | | | |
| EXAMPLES | 28,30 | 28,32 | 33,35 | 33,37 |
| SAS (cc/100 mg) | −0.081 | 0.222 | −1.529 | −0.229 |
| STRUCTURE SENSITIVITY INDEX (SSI) | −0.91 | −1.47 | −0.52 | −0.85 |

Note: Numbers listed in Rows 1 and 3 labeled "EXAMPLES" correspond to the examples used to calculate values for the SAS's listed in Rows 2 and 4, respectively. The SAS values were used in turn to calculate the SSI values shown in Row 5.

EXAMPLES 38–40

Examples 38 through 40 of Table 11 demonstrates the process of the present invention while using a light liquid hydrocarbon as the auxiliary hydrocarbon. The liquid hydrocarbon was a commercially available diesel fuel designated as diesel type D-2 and having typical properties listed in Table 10 below.

TABLE 10

Properties of Liquid Auxiliary Hydrocarbon (Type D-2 Diesel Fuel).

| | |
|---|---|
| H/C Ratio | 1.68 |
| Hydrogen (WT. %) | 12.2 |
| Carbon (WT. %) | 86.5 |
| Sulfur (WT. %) | 0.3 |
| Nitrogen (WT. %) | <0.1 |
| API Gravity - 288.6/288.6K | 35.4 |
| Specific Gravity 288.6/288.6K | 0.848 |
| Viscosity, @327.4K ($m^2$/s) | $2.7 \times 10^{-6}$ |
| Viscosity, @371.9K ($m^2$s) | $<1.8 \times 10^{-6}$ |

In these examples, 0.634 SCMS (85 KSCFH) of air preheated to 755 K (900° F.) and 0.016 SCMS (2.16 KSCFH) of natural gas at ambient temperature of approximately 298 K (77° F.) were introduced into the combustion zone. The resultant primary combustion is estimated at 400 percent. Example 38 represents a control run during which the carbon black yielding feedstock was introduced substantially transversely into zone 12 at a rate of $1.9 \times 10^{-4}$ m³/s (181 gph) through four (4) 0.206 cm (0.081 inch) diameter orifices (32) located at the outer periphery of the stream of combustion gases. The resulting overall combustion is estimated at 28.2 percent and the reaction was quenched with water at a point about 7.93 meters (26 feet) downstream of the plane of feedstock injection. The resulting carbon black has an iodine adsorption number of 70 mg/g and a DBPA of 150 cc/100 g. In Example 39, the operating conditions were identical to those used in Example 38 except the overall combustion was reduced in Example 39 to 23.6 percent by mixing diesel fuel at a rate of $4.53 \times 10^{-5}$ m³/s (43 gph) with the feedstock stream before introducing the combined feedstock and diesel fuel stream into the carbon forming process. The mixture of the carbon black yielding feedstock and diesel fuel was introduced substantially transversely into the stream of hot combustion gases through four (4) 0.226 cm (0.089 inch) diameter orifices (32) located at the outer periphery of the stream of combustion gases. The carbon black so-produced has an iodine adsorption number of 31 mg/g and a DBPA of 141 cc/100 g. In Example 40, the operating conditions were identical to those used in Example 38 except the overall combustion was reduced in Example 40 to 24.5 percent by increasing the flow rate of the carbon black yielding feedstock to $2.21 \times 10^{-4}$ m³/s (210 gph). In Example 40, the feedstock was introduced substantially transversely into the stream of hot combustion gases through four (4) 0.226 cm (0.089 inch) diameter orifices (32) located at the outer periphery of the stream of combustion gases. The carbon black so-produced has an iodine adsorption number of 45 mg/g and a DBPA of 147 cc/100 g. The resulting SSI value calculated from the SAS values for examples 38 through 40 are less than zero, as listed under case K of Table 12.

TABLE 11

OPERATING CONDITIONS AND ANALYTICAL PROPERTIES OF CARBON BLACKS

| | Example Number | | |
|---|---|---|---|
| | 38 | 39 | 40 |
| D-1, m | 0.18 | 0.18 | 0.18 |
| D-2, m | 0.13 | 0.13 | 0.13 |
| D-3, m | 0.69 | 0.69 | 0.69 |
| L-1, m | 0.61 | 0.61 | 0.61 |
| L-2, m | 0.30 | 0.30 | 0.30 |
| L-3, m | 0.23 | 0.23 | 0.23 |
| F-1, m | 0.11 | 0.11 | 0.11 |
| H-1, m | n.a. | n.a. | n.a. |
| Q, m | 7.93 | 7.93 | 7.93 |
| Reactor Entry Section | "B" | "B" | "B" |
| Comb. Air, SCMS | 0.634 | 0.634 | 0.634 |
| Comb. Air Preheat, K | 755 | 755 | 755 |
| Burner Nat. Gas, SCMS | 0.016 | 0.016 | 0.016 |
| Air/Burn Gas Ratio | 9.7 | 9.7 | 9.7 |
| Feedstock Inj. Point,) | 32 | 32 | 32 |
| Tips # × Size, cm) | 4 × .206 | 4 × .226 | 4 × .226 |
| Feedstock Rate, m3/s | 1.90E-04 | 1.90E-04 | 2.21E-04 |
| Feedstock Pr., kPa | 290 | 297 | 243 |
| Feedstock Preheat, K | 395 | 397 | 396 |
| K+, gK+/m3 oil | 0.00 | 0.00 | 0.00 |
| Diesel Inj. Point | 32 | 32 | 32 |
| Diesel Rate, m3/s | 0.00 | 4.53E-05 | 0.00 |
| Quench Pressure, kPa | 938 | 902 | 940 |
| Quench Temperature, K | 1,007 | 1,005 | 1,005 |
| Primary Comb., % | 400 | 400 | 400 |
| Overall Comb., % | 28.2 | 23.6 | 24.5 |
| % C of Aux. Hydrocarbon | 0.0 | 14.0 | 0.0 |
| I2 No. (mg/g) | 70 | 31 | 45 |
| DBPA, cc/100 g | 150 | 141 | 147 |

Inj. = Injection; Comb. = Combustion; Aux. = Auxiliary; Nat. = Natural; Pr. = pressure; m = meters; cm = centimeters; kPa = kiloPascal; K = kelvin; K+ = potassium; n.a. = not applicable; SCMS = standard cubic meters/second (273K, 101.3kPa); gK+/m3 oil = grams K+/m3 of feedstock (oil)

TABLE 12

STRUCTURE SENSITIVITY INDEX

| | | CASE K |
|---|---|---|
| | FEEDSTOCK ADDITION: | |
| 1 | EXAMPLES | 38,40 |
| 2 | SAS (cc/100 mg) | 0.121 |
| | AUXILIARY HYDROCARBON ADDITION: | |
| 3 | EXAMPLES | 38,39 |
| 4 | SAS (cc/100 mg) | 0.235 |
| 5 | STRUCTURE SENSITIVITY INDEX (SSI) | −0.94 |

EXAMPLES 41–45

In examples 41 through 45 of Table 13, the present invention is demonstrated wherein surface area and structure decrease as auxiliary hydrocarbon is added at otherwise constant process flow rates. In these examples, 0.101 SCMS (13.5 KSCFH) of air preheated to 755 K (900° F.) and 0.003 SCMS (0.348 KSCFH) of natural gas at ambient temperature of approximately 298 K (77° F.) were introduced into the combustion zone. The resultant primary combustion is estimated at 400 percent. The reaction was quenched with water at a point about 4.9 meters (16 feet) downstream of the plane of feedstock injection.

Example 41 represents a control run during which the carbon black yielding feedstock was introduced substantially transversely into zone 12 at a rate of 2.65×10$^{-5}$ m$^3$/s (25.1 gph) through three (3) 0.102 cm (0.040 inch) diameter orifices (32) located at the outer periphery of the stream of combustion gases. The resulting overall combustion is estimated at 32.0 percent. The resulting carbon black has an iodine adsorption number of 92 mg/g and a DBPA of 142 cc/100 g.

In Example 42, the operating conditions were identical to those used in Example 41 except the overall combustion was increased in Example 42 to 35.0 percent by reducing the feedstock flow rate to 2.407×10$^{-5}$ m$^3$/s (22.8 gph). The carbon black yielding feedstock was introduced substantially transversely into the stream of hot combustion gases through three (3) 0.091 cm (0.036 inch) diameter orifices (32) located at the outer periphery of the stream of first-stage combustion gases. The carbon black so-produced has an iodine adsorption number of 117 mg/g and a DBPA of 153 cc/100 g.

In Example 43, the operating conditions were identical to those used in Example 41 except the overall combustion was reduced in Example 43 to 29.4 percent by adding auxiliary hydrocarbon as a sheath (75) of natural gas around the feedstock tips. The %C of auxiliary hydrocarbon was raised to 5.1% in Example 43 by adding 0.003 SCMS (0.37 KSCFH) of natural gas. In Example 43, the feedstock was introduced substantially transversely into the stream of hot combustion gases through three (3) 0.102 cm (0.040 inch) diameter orifices (32) located at the outer periphery of the stream of combustion gases. The carbon black so-produced has an iodine adsorption number of 60 mg/g and a DBPA of 121.8 cc/100 g. The resulting SSI value calculated from the SAS values for examples 41 through 43 is less than zero, as listed under case L of Table 14.

In Example 44, theoperating conditions were identical to those used in Example 41 except the overall combustion was reduced in Example 44 to 28.7 percent by adding auxiliary hydrocarbon as a sheath (75) of gaseous propane around the feedstock tips. The %C of auxiliary hydrocarbon was raised to 8.0% in Example 44 by adding 0.001 SCMS (0.20 KSCFH) of gaseous propane. In Example 44, the feedstock was introduced substantially transversely into the stream of hot combustion gases through three (3) 0.102 cm (0.040 inch) diameter orifices (32) located at the outer periphery of the stream of combustion gases. The carbon black so-produced has an iodine adsorption number of 49 mg/g and a DBPA of 114 cc/100 g. The resulting SSI value calculated from the SAS values for examples 41, 42, and 44 is less than zero, as listed under case M of Table 14.

In Example 45, the operating conditions were identical to those used in Example 41 except the overall combustion was reduced in Example 45 to 30.5 percent by adding auxiliary hydrocarbon as a sheath (75) of hydrogen gas around the feedstock tips. The %H of auxiliary hydrocarbon was raised to 2.1% in Example 45 by adding 0.006 SCMS (0.875 KSCFH) of hydrogen gas. In Example 45, the feedstock was introduced substantially transversely into the stream of hot combustion gases through three (3) 0.102 cm (0.040 inch) diameter orifices (32) located at the outer periphery of the stream of combustion gases. The carbon black so-produced has an iodine adsorption number of 77 mg/g and a DBPA of 134 cc/100g. The resulting SSI value calculated from the SAS values for examples 41, 42, and 45 is less than zero, as listed under case N of Table 14.

TABLE 13

OPERATING CONDITIONS AND ANALYTICAL PROPERTIES OF CARBON BLACKS

| | Example Number | | | | |
|---|---|---|---|---|---|
| | 41 | 42 | 43 | 44 | 45 |
| D-1, m | 0.10 | 0.10 | 0.10 | 0.10 | 0.10 |
| D-2, m | 0.05 | 0.05 | 0.05 | 0.05 | 0.05 |
| D-3, m | 0.15 | 0.15 | 0.15 | 0.15 | 0.15 |
| L-1, m | 0.67 | 0.67 | 0.67 | 0.67 | 0.67 |
| L-2, m | 0.18 | 0.18 | 0.18 | 0.18 | 0.18 |
| L-3, m | 0.15 | 0.15 | 0.15 | 0.15 | 0.15 |
| F-1, m | 0.11 | 0.11 | 0.11 | 0.11 | 0.11 |
| H-1, m | n.a. | n.a. | n.a. | n.a. | n.a. |
| Q, m | 4.90 | 4.90 | 4.90 | 4.90 | 4.90 |
| Reactor Entry Section | "D" | "D" | "D" | "D" | "D" |
| Comb. Air, SCMS | 0.101 | 0.101 | 0.101 | 0.101 | 0.101 |
| Comb. Air Preheat, K | 755 | 755 | 755 | 755 | 755 |
| Burner Nat. Gas, SCMS | 0.003 | 0.003 | 0.003 | 0.003 | 0.003 |
| Air/Burn Gas Ratio | 9.7 | 9.7 | 9.7 | 9.7 | 9.7 |
| Feedstock Inj. Point,) | 32 | 32 | 32 | 32 | 32 |
| Tips # × Size, cm) | 3 × .102 | 3 × .102 | 3 × .102 | 3 × .102 | 3 × .102 |
| Feedstock Rate, m3/s | 2.65E-05 | 2.41E-05 | 2.65E-05 | 2.65E-05 | 2.65E-05 |
| Feedstock Pr., kPa | 143 | | 180 | 180 | 210 |
| Feedstock Preheat, K | 383 | 383 | 383 | 383 | 383 |
| K+, gK+/m3 oil | 0.00 | 0.00 | 0.00 | 0.00 | 0.00 |
| Quench Temperature, K | 978 | 978 | 978 | 978 | 978 |
| Type of Aux. Hydrocarbon | n.a. | n.a. | Nat. gas | Propane | Hydrogen |
| Aux. Hydrocarbon Inj. Point) | n.a. | n.a. | 75 | 75 | 75 |
| Orifices # × Size, cm) | n.a. | n.a. | 3 × .240 | 3 × .240 | 3 × .240 |
| Aux. Hydrocarbon, SCMS | 0.000 | 0.000 | 0.003 | 0.001 | 0.006 |
| Primary Comb., % | 400 | 400 | 400 | 400 | 400 |
| Overall Comb., % | 32.0 | 35.0 | 29.4 | 28.7 | 30.5 |
| % C of Aux. Hydrocarbon | n.a. | n.a. | 5.1 | 8.0 | n.a. |
| % H of Aux. Hydrocarbon | n.a. | n.a. | n.a. | n.a. | 2.1 |
| I2 No. (mg/g) | 92 | 117 | 60 | 49 | 77 |

TABLE 13-continued
OPERATING CONDITIONS AND ANALYTICAL PROPERTIES OF CARBON BLACKS

| | Example Number | | | | |
|---|---|---|---|---|---|
| | 41 | 42 | 43 | 44 | 45 |
| DBPA, cc/100 g | 142 | 153 | 122 | 114 | 134 |

Inj. = Injection; Comb. = Combustion; Aux. = Auxiliary; Nat. = Natural; Pr. = pressure; m = meters; cm = centimeters; kPa = kiloPascal; K = kelvin; K+ = potassium; n.a. = not applicable; SCMS = standard cubic meters/second (273K, 101.3kPa); gK+/m3 oil = grams K+/m3 of feedstock (oil)

TABLE 14
STRUCTURE SENSITIVITY INDEX

| | CASE | | |
|---|---|---|---|
| | L | M | N |
| FEEDSTOCK ADDITION: | | | |
| EXAMPLES | 41,42 | 41,42 | 41,42 |
| SAS (cc/100 mg) | 0.448 | 0.448 | 0.448 |
| AUXILIARY HYDRO-CARBON ADDITION: | | | |
| EXAMPLES | 41,43 | 41,44 | 41,45 |
| SAS (cc/100 mg) | 0.612 | 0.644 | 0.507 |
| STRUCTURE SENSITIVITY INDEX (SSI) | −0.37 | −0.44 | −0.13 |

Note: Numbers listed in Rows 1 and 3 labeled "EXAMPLES" correspond to the examples used to calculate values for the SAS's listed in Rows 2 and 4, respectively. The SAS values were used in turn to calculate the SSI values shown in Row 5.

The previous examples demonstrate that, under well-defined conditions of primary combustion and overall combustion, adding auxiliary hydrocarbon to the present multi-stage carbon black forming process in such a way that essentially unreacted auxiliary hydrocarbon enters the reaction zone produces carbon blacks with lower surface area at a given overall combustion level than those produced by the conventional method of adding feedstock regardless of the method used for adding the feedstock or auxiliary hydrocarbon. Furthermore, these examples also demonstrate that the present invention allows production of lower-than-normal structure carbon blacks for a given surface area. An auxiliary hydrocarbon addition process operated as defined herein results in an SSI that is less than zero.

While the present invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. In a multi-staged process for producing furnace carbon blacks which exhibit both lower-than-normal structure at a given surface area, and lower-than-normal surface area at a given overall combustion level wherein in a first stage there is produced a stream of hot gases possessing sufficient energy to convert a carbon black-yielding hydrocarbonaceous feedstock to carbon black which stream is propelled into a second stage where feedstock is injected into said gaseous stream, and in a subsequent stage the feedstock is converted into carbon black prior to the termination of carbon forming reactions by quenching, and the cooling, separating, and recovering the resultant carbon black, the improvement which comprises separately introducing essentially unreacted auxiliary hydrocarbon into a reaction zone wherein the feedstock is at the moment undergoing the carbon forming reactions to form the carbon particles which reaction zone is located from about the point of feedstock injection to about the point of quenching, and adjusting the primary combustion level and overall combustion level, so that the structure sensitivity index (SSI) of the process is less than zero, said SSI being defined by the formula:

$$SSI = \frac{SAS_{mf} - SAS_{ah}}{|SAS_{mf}|}$$

where $$SAS_{mf} = \frac{\Delta(DBP)_{mf}}{\Delta(\text{Iodine Number})_{mf}};$$

$$SAS_{ah} = \frac{\Delta(DBP)_{ah}}{\Delta(\text{Iodine Number})_{ah}};$$

$|SAS_{mf}|$ = Absolution value of SAS $_{mf}$;

$\Delta(DBP)_{mf}$ = the change in DBPA of the carbon black due to a change in feedstock flow rate while all other process operating conditions are held constant;

$\Delta(\text{Iodine Number})_{mf}$ = the change in iodine adsorption number of the carbon black due to a change in feedstock flow rate while all other process operating conditions are held constant;

$\Delta(DBP)_{ah}$ = the change in DBPA of the carbon black due to a change in auxiliary hydrocarbon flow rate while all other process operating conditions are held constant; and $\Delta(\text{Iodine Number})_{ah}$ = the change in iodine adsorption number of the carbon black due to a change in auxiliary hydrocarbon flow rate while all other process operating conditions are held constant.

2. A process as described in claim 1 wherein the stream of hot gases produced in the first stage is the product of combustion of a fuel and an oxidant.

3. A process as described in claim 1 wherein the stream of hot gases produced in the first stage is an oxidant.

4. A process as described in claim 1 wherein the auxiliary hydrocarbon is in gaseous form.

5. A process as described in claim 1 wherein the auxiliary hydrocarbon is in liquid form.

6. A process as described in claim 1 wherein the primary combustion level is between 140% and 1000%.

7. A process as described in claim 1 wherein the feedstock is injected substantially axially into the combustion gases.

8. A process as described in claim 1 wherein the feedstock is injected substantially transversely into the combustion gases.

9. A process as described in claim 1 wherein the auxiliary hydrocarbon is injected substantially transversely into the reaction zone.

10. A process as described in claim 1 wherein the auxiliary hydrocarbon is injected substantially axially into the reaction zone.

11. A process as described in claim 1 wherein the auxiliary hydrocarbon is introduced in a direction substantially tangential to the flow of the hot combustion gases.

12. A process as described in claim 1 wherein the auxiliary hydrocarbon is injected into a region extending axially from about 0.5 reactor diameter lengths before the point of feedstock injection to a point about 0.5 reactor diameter lengths after the point of feedstock injection.

13. A process as described in claim 1 wherein the auxiliary hydrocarbon is hydrocarbonaceous and is introduced in an amount such that the carbon content of auxiliary hydrocarbon is less than about 60% by weight of the total carbon content of the reactants.

14. A process as described in claim 1 wherein the auxiliary hydrocarbon is hydrocarbonaceous and is introduced in an amount such that the carbon content of auxiliary hydrocarbon is less than about 30% by weight of the total carbon content of the reactants and the auxiliary hydrocarbon is in gaseous form.

15. A process as described in claim 1 wherein the auxiliary hydrocarbon is hydrocarbonaceous and is introduced in an amount such that the carbon content of auxiliary hydrocarbon is less than about 15% by weight of the total carbon content of the reactants and the auxiliary hydrocarbon is in gaseous form.

16. A process as described in claim 1 wherein the auxiliary hydrocarbon is hydrogen and is introduced in an amount such that the hydrogen content of auxiliary hydrocarbon is less than about 60% by weight of the total hydrogen content of the reactants.

17. A process as described in claim 1 wherein the auxiliary hydrocarbon is hydrogen and is introduced in an amount such that the hydrogen content of auxiliary hydrocarbon is less than about 30% by weight of the total hydrogen content of the reactants.

18. A process as described in claim 1 wherein the auxiliary hydrocarbon is hydrogen and is introduced in an amount such that the hydrogen content of auxiliary hydrocarbon is less than about 15% by weight of the total hydrogen content of the reactants.

* * * * *